Dec. 30, 1969  A. R. HACKER ET AL  3,486,607
BELT STRUCTURE
Filed Aug. 8, 1967  2 Sheets-Sheet 1
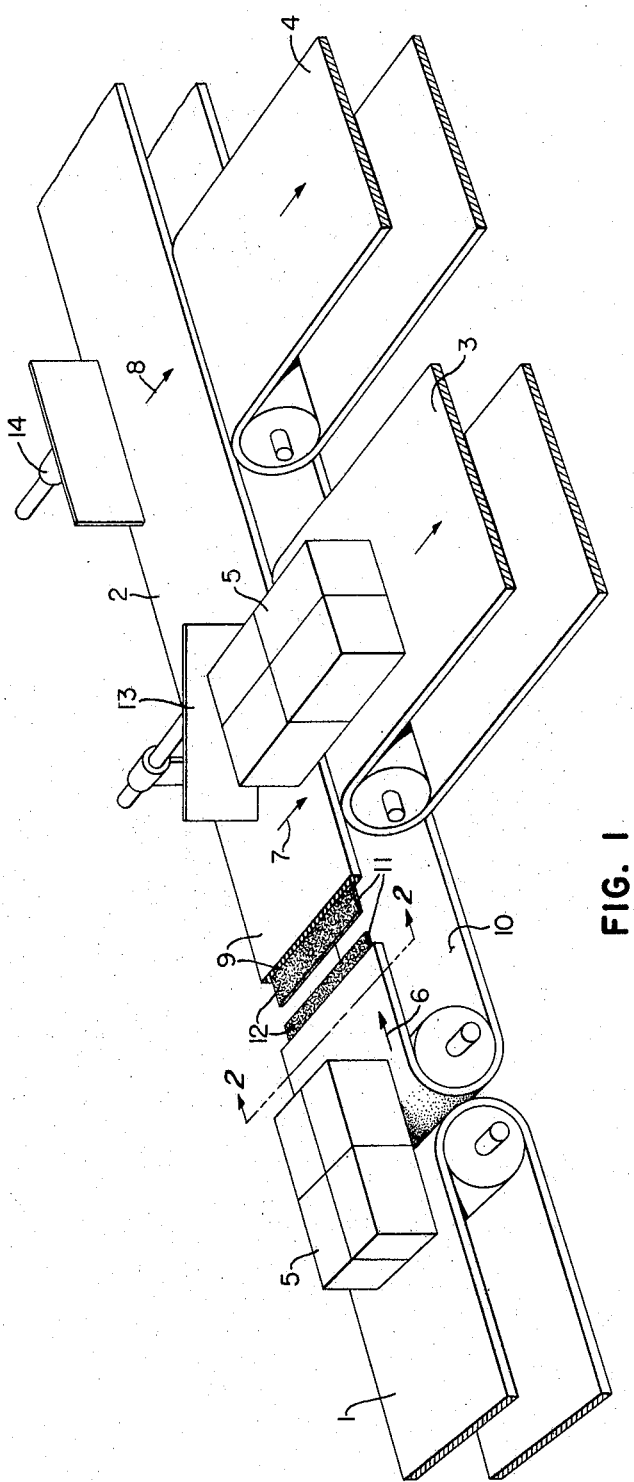
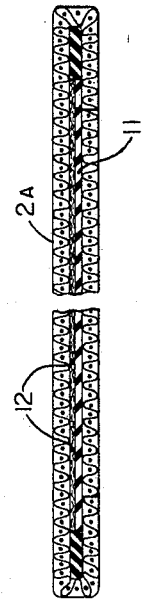
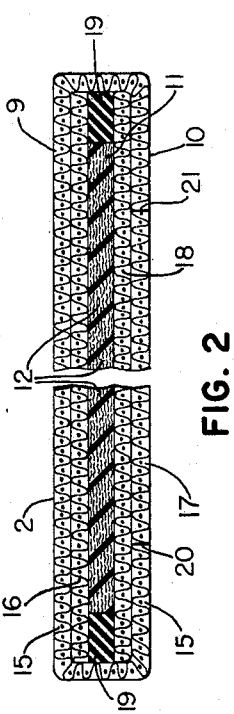
INVENTOR.
ARDEN R. HACKER
LOUIS SEELBACH KRAFT
ATTORNEY Dec. 30, 1969  A. R. HACKER ET AL  3,486,607
BELT STRUCTURE
Filed Aug. 8, 1967  2 Sheets-Sheet 2
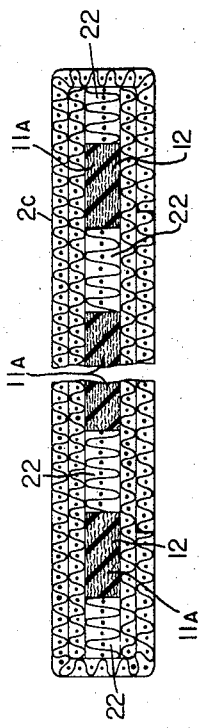
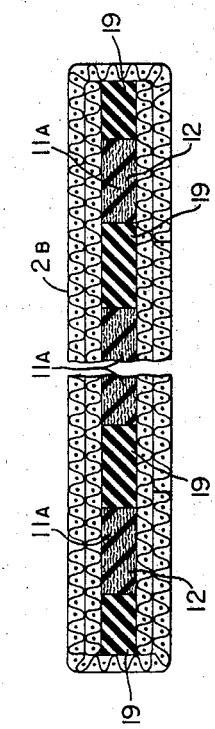
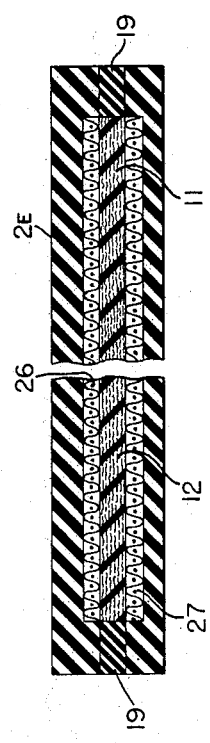
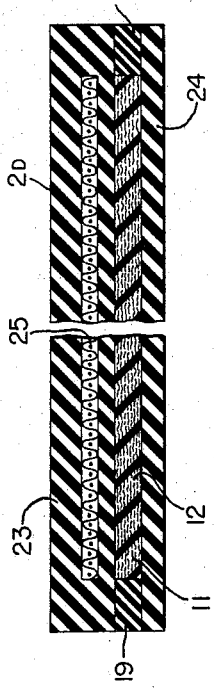
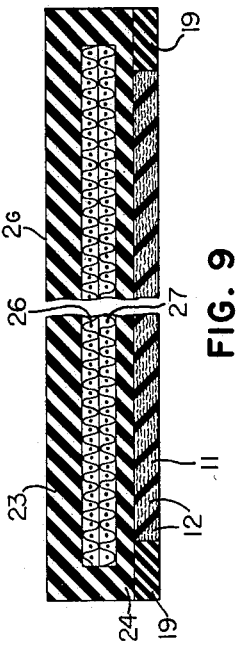
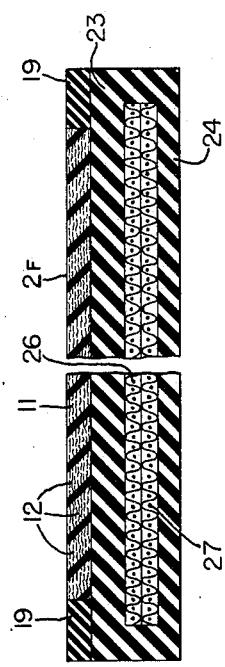
*INVENTOR.*
ARDEN R. HACKER
LOUIS SEELBACH KRAFT
*R. H. Hatton*
ATTORNEY ically coded of flexible conveyor belts is a
relatively new concept using metallic code retaining elements disposed within the belt to form a "memory" layer.
In this way, the basic principles of magnetic polarity are
utilized to place an invisible "address" or destination code
in the belt with the result that materials being conveyed
on the belt may be deposited at predetermined receiving
points.

United States Patent Office 3,486,607
Patented Dec. 30, 1969

3,486,607
BELT STRUCTURE
Arden R. Hacker, Kent, and Louis Seelbach Kraft, Stow, Ohio, assignors to The Goodyear Tire & Rubber Company, Akron, Ohio, a corporation of Ohio
Filed Aug. 8, 1967, Ser. No. 659,135
Int. Cl. B65g *15/58, 15/32*
U.S. Cl. 198—193
14 Claims

ABSTRACT OF THE DISCLOSURE

A flexible endless material transporting conveyor belt containing a layer of flexible plastic material combined with short lengths of ferro-magnetic wire forming a memory-retaining layer to provide a field for the acceptance and retention of magnetic signals. The wire may be dispersed within the layer itself or on the top surface thereof and may be incorporated into various locations in the belt structure and into all types of fabric, elastomeric, and other flexible plastic belting to produce a memory-retaining conveying device. These "memory" belts are designed to operate in conjunction with electronic equipment to effectively sort and dispatch both individual articles and bulk materials.

BACKGROUND OF THE INVENTION

This invention relates to conveyor belts for transporting materials and more specifically, to flexible belts containing ferro-magnetic material to provide a field for the acceptance of magnetic signals.

The magnetic coding of flexible conveyor belts is a relatively new concept using metallic code retaining elements disposed within the belt to form a "memory" layer. In this way, the basic principles of magnetic polarity are utilized to place an invisible "address" or destination code in the belt with the result that materials being conveyed on the belt may be deposited at predetermined receiving points.

Although both individual articles and bulk materials may be effectively sorted and dispatched in this manner, to date the belts have primarily been used for transporting packaged items. Thus the principal users of memory retaining belts have been post offices, mail order warehouses, department stores, and baggage handling facilities.

The magnetized metallic elements within this memory layer of the belt have taken various forms. For example, transverse steel rods and lengths of steel wire running both transversely and longitudinally of the belt have been used for this purpose. In addition, Prosser et al., United States Patent No. 3,275,123 discloses the use of non-continuous steel staples or metallic strips as code bearing elements in a conveyor belt. Granular magnetic material such as magnetite particles have also been incorporated into elastomeric belts as illustrated by Curtis, United States Patent No. 2,655,195.

However, all of these above-mentioned materials have had disadvantages of one type or another. For instance, the use of transverse individual metallic elements results in the situation referred to as "cross talk" in which the magnetic field tends to distribute itself along the entire magnetic element to frequently cause a new code to be created or weaken the code to such a point that it is inoperable. The incorporation of these metallic elements in a belt may also result in a significant reduction of the required physical properties of the belt and interfere with the necessary flexibility and operability of the belt. Even more significantly, all the previously discussed materials have proven unsuitable for belting construction by imposing orientation problems inconsistent with belting production requirements.

These difficulties have been successfully overcome by utilizing short lengths of "shredded" randomly dispersed wire as the magnetizable material and combining this material with a flexible plastic materials to form a memory layer in the belt structure. The wire may be continuously combined with this layer along the entire length and width of the belt, or may be combined in only portions of the layer to form blocks of ferro-magnetic material spaced along the belt length. In addition, the layer also may have the magnetizable medium in the form of continuous or non-continuous parallel strips placed across the belt width at spaced intervals throughout the length of the belt.

Preferably, the short wire pieces are uniformly distributed throughout each portion and actually disposed within the flexible plastic layer, but depending upon the thickness of the layer, they may also be merely "sprinkled" on the top surface of the layer in the desired locations. All that is necessary is that a sufficient quantity of the wire pieces be used to provide a suitable field for the acceptance of magnetic signals to be applied in the operation of the belt. The strength of the magnetic field is determined by the conditions of the particular application.

The sizes of the individual pieces of wire are such that no problem is encountered with "cross talk." In addition, the size and small quantity of the wire required to provide the necessary field causes no detrimental effect on the physical properties or functioning of the belt and in some instances, is beneficial to the performance of the belt. Furthermore, the short lengths of wire can be easily dispersed in the flexible plastic material on a mill and then sheeted as a wire-containing layer from the mill and calendered or extruded into the various gauges desired. The overall layer thickness may thus be obtained by plying up several layers. Depending on the type of belt being coded, the memory layer may also be formed by placing or "sprinkling" the wire on the top surface of a single ply of the calendered or extruded flexible plastic sheet. This may be accomplished, for instance, by means of a frequency vibration tray. Subsequently, the memory layer is incorporated into the belt structure and laminated by vulcanization to form an integral unitary belt.

The memory layer of this invention may be incorporated in any type of conveyor belt known in the art depending upon the requirements of the particular application. For example, the belt may have a friction surface, bare surface or elastomeric covers, either on the conveyor side or pulley side, or any combination of these constructions. As will become apparent, the memory layer may also be located in various positions of the belt section such as near or on the top or bottom surface or between any layers of the fabric reinforcement. Again, the particular use will determine the location of this layer.

The use of "shredded" wire in an article of manufacture is not new in the art. Elastomeric layers containing short lengths of wire, for example, have been used previously in such products as tires, conveyor belts, and hose. However, these previous uses have been for the exclusive purpose of protecting the product from severe impact or abrasion and not to provide a field for the acceptance of magnetic signals. The satisfactory performance of any belt of this structure would be purely accidental and not the result of a carefully constructed and controlled belt structure necessary for the present day uses. For instance, the previous use in belting, as disclosed in Hacker et al., United States Patent No. 3,246,735, has been to provide an abrasion or shock resistant barrier in a heavy duty conveyor belt near its top cover to protect the belt carcass against penetration of foreign objects. The thickness of the wire-containing layer in this type belt is usually required to be at least one half of the top cover thickness. In contrast, as previously mentioned, this same layer in the memory-retaining belts of the present invention need not be placed in any particular location nor be of any specified gauge and may be incorporated into extremely lightweight belt structures.

OBJECTS OF THE INVENTION

It is an object of this invention to provide a belt construction that is capable of being electrically coded with intelligence yet be able to function as a conventional conveyor for the transporting of materials.

Another important object of this invention is to provide a belt structure containing ferro-magnetic material which will satisfy belting construction techniques and at the same time provide a field for the acceptance of magnetic signals without sacrificing the required physical properties of the belt.

A further object of the invention is to provide a ferromagnetic material for a memory-retaining belt which will not cause interference with the magnetic code but still retain a code of sufficient electrical strength.

Other objects and advantages of this invention will become apparent hereinafter as the description thereof proceeds, the novel features, arrangements and combinations being clearly pointed out in the specification as well as the claims thereunto appended.

BRIEF DESCRIPTION OF THE DRAWING

FIG. 1 is a perspective view with a portion broken away illustrating the use of the memory-retaining belt of this invention.

FIG. 2 is an enlarged section taken substantially through 2—2 of FIG. 1.

FIG. 3 is a modification of the invention shown in FIG. 2.

FIG. 4 is another modification of the invention shown in FIG. 2.

FIG. 5 is still another modification of the invention shown in FIG. 2.

FIG. 6 is another form of the invention shown in FIG. 2.

FIG. 7 is a modification of the invention shown in FIG. 6.

FIG. 8 is another modification of the invention shown in FIG. 6.

FIG. 9 is still another modification of the invention shown in FIG. 6.

DESCRIPTION OF THE PREFERRED EMBODIMENTS

In FIG. 1, a group of flexible endless conveyor belts 1, 2, 3 and 4 illustrate a simple system to convey and distribute articles, such as packages 5, to various selected points represented by numerals 6, 7 and 8. Of course, this is only a specific example and many other conveying systems are also possible.

The memory-retaining belt 2 is of nearly uniform cross section having a top layer 9 and a bottom layer 10 of flexible material such as textile fabric or natural or synthetic rubber or rubber-like material. Between the top layer 9 and bottom layer 10, is a layer 11 of flexible plastic material such as natural or synthetic rubber, polyvinyl chloride or the like containing short lengths of ferromagnetic wire 12. The wire 12 may be of any suitable composition, but is usually brass-coated to form a bond with the rubber or rubber-like material. The individual pieces of the short lengths of wire 12 may range in gauge from .0025 to .015 inch. For example, AISI C1065 brass plated drawn wire, .006 gauge shredded to ½ inch in length has proven very satisfactory for the intended purpose and application. The transfer belt 1 and the receiving belts 3 and 4 are conventional non-magnetic conveyor belts.

Package 5 is transferred from belt 1 to belt 2 at point 6. Of course, it is not necessary to use belt 1 for this purpose as the articles to be sorted may also be manually placed on belt 2. Belt 2 is designed to operate with certain electronic controls and equipment (not shown). For example, this equipment "writes" a magnetic code pattern on the short lengths of wire 12 embedded in the memory layer 11 of belt 2 and "reads" or responds to the code which, for instance, may activate a diverter 13 to deposit package 5 onto belt 3 at point 7. Belt 3 then carries the package 5 to its final destination. If a different destination is desired, the code will be such that point 7 is bypassed and diverter 14 is activated to deposit package 5 at point 8 onto one of the other belts 4 of the series of receiving belts located along the length of belt 2. It is to be understood that there can be any number of these receiving belts and diverters depending upon the number of destination points required. Other means of receiving packages or articles such as chutes may be used in place of belts depending upon the type of installation.

Optionally, it may be advisable to equip belt 2 with one or more guiding devices (not shown) to protect the belt edges from damage and excessive wear. For this purpose, V-belt sections may be vulcanized or affixed to either the top or bottom surface of the belting.

The usual "memory" belt construction of this invention is shown in more detail in FIG. 2 which is an enlarged section of belt 2 of FIG. 1 taken through 2—2. The top layer 9 of belt 2 is comprised of two plies 15 and 16 of conventional textile fabric such as cotton, nylon, rayon, or polyester and the bottom layer 10 is also comprised of two plies 17 and 18 of the same or similar textile material. The lower ply 16 of the top layer 9 and the plies 17 and 18 of the bottom layer 10 are normally frictioned and/or coated with a natural rubber elastomer. Preferably, the upper ply 15 of the top layer 9 is frictioned and coated on only one side thus allowing a bare fabric top covering to provide a surface having a low coefficient of friction thus allowing the articles to be easily diverted from the memory-retaining belt onto the receiving belt.

The memory layer 11 is parallel to the top layer 9 and bottom layer 10 and is composed of a natural rubber compound which contains short lengths of wire 12 randomly dispersed throughout at least one portion of the layer. Also, since the electronic equipment is normally located in nearest proximity to the bottom surface of the memory-retaining belt, it is desirable, but not necessary, that the layer 11 be located nearer to the bottom layer 10 of the belt 2. The thickness of the layer 11 may vary considerably without affecting its code-retaining ability. However, from a processing standpoint, it has been found that the most satisfactory gauge for the layer 11, when the short lengths of wire 12 are actually embedded in the elastomeric material, is approximately $\frac{1}{16}$ inch or more precisely .060 gauge. This dimension may also be as little as .030 inch if the memory layer is composed of a thermoplastic material. Lighter gauges, to a minimum of .010 inch, will also retain a satisfactory signal when the short lengths of wire 12 are sprinkled on the top surface of the layer 11. A suitable amount of wire for this purpose, based on the weight of the elastomeric material, is between 10 and 25 percent. Although the memory layer 11 may extend the full width of the belt 2, it is preferable to stop short of full width and insert a narrow non-magnetic natural rubber strip 19 at each edge of the belt 2 to prevent the exposure of the short lengths of wire 12 along the length of the belt 2. As can be seen in FIG. 2, additional protection is provided by wrapping outer fabric ply 15 partially around this structure forming a seam with bottom fabric ply 17 at 20 and 21.

FIG. 3 is a modification of the belt structure shown in FIG. 2 indicating that the short lengths of wire 12 may alternatively be placed only on the top surface of layer 11 of the belt 2A. This variation may be utilized when a particular belt is designed for extremely light duty applications and the thickness of the layer 11 is substantially less than .060 inch as when such belt is required to travel over very small diameter rollers or pulleys.

FIG. 4 shows another modification of the belt structure of FIG. 2 in which the memory plane of belt 2B takes the form of a number of parallel wire-containing strips 11A placed across the belt width and separated from each other by narrow elastomeric strips 19. These strips may be continuous or non-continuous along the length of belt 2B.

FIG. 5 is still another modification of the belt structure shown in FIG. 2 indicating that the strips 11A of belt 2C may also be separated by narrow lengths of fabric 22. The modifications shown in FIGS. 4 and 5, however, would normally be more costly to implement and therefore are considered to be less desirable constructions.

FIG. 6 is another form of the invention shown in FIG. 2 disclosing a belt structure in which belt 2D has a top layer 23 and bottom layer 24 each comprised of a flexible plastic material such as natural or synthetic rubber. The top layer 23 is reinforced by at least one ply 25 of conventional textile fabric such as cotton, nylon, or rayon. The intermediate elastomeric layer 11 is separate from and generally parallel to the fabric reinforcement ply 25. The layer 11 contains short lengths of randomly dispersed wire 12 and a narrow natural rubber elastomeric strip 19 is inserted along each edge of the belt 2D extending generally the belt length to prevent exposure of the short lengths of wire 12. As previously mentioned, the wire 12 may also be dispersed on the top surface of layer 11 rather than embedded therein.

The belt structure shown in FIG. 7 is a modification of the invention shown in FIG. 6. As illustrated, the layer 11 containing the short lengths of wire 12, in this instance, is disposed between two plies 26 and 27 of the fabric reinforcement of belt 2E. This construction is further evidence of the versatility of this invention in that the memory layer 11 may be placed in a number of various locations within the belt structure. In fact, as shown in FIGS. 8 and 9, it is possible, although not normally feasible or practical, that layer 11 may actually make up either the top layer 23 of belt 2F or the bottom layer 24 of belt 2G rather than being incorporated within the belt structure.

While certain representative embodiments and details have been shown for the purpose of illustrating the invention, it will be apparent to those skilled in the art that various changes and modfications may be made therein without departing from the invention.

We claim:

1. A conveyor belt for transporting materials thereon comprising at least:
   (A) a first layer of flexible material;
   (B) a second layer of flexible material positioned on said first layer, said second layer formed of flexible plastic material and extending generally throughout the length of the belt with at least one portion thereof having uniformly distributed short lengths of randomly dispersed wire incorporated therewith to provide a memory-retaining layer for receiving and retaining magnetic signals applied thereto; and
   (C) a third layer of flexible material superposed on said second layer, all said layers being joined into an integral composite structure.

2. A belt as claimed in claim 1 wherein the second layer comprises a plurality of spaced parallel memory-retaining layers positioned in the same plane thereof across the width of the belt and extending generally lengthwise thereof.

3. A belt as claimed in claim 1 wherein the thickness of the first layer thereof is less than the thickness of the third layer thereof.

4. A belt as claimed in claim 1 wherein the first and third layers include at least one ply of textile fabric.

5. A belt as claimed in claim 1 wherein the first and third layers are comprised of flexible plastic material and at least one of said layers contains a layer of reinforcing material therein extending longitudinally of the belt and substantially parallel to the second layer thereof, said reinforcing material including at least one ply of reinforcing fabric therein.

6. A belt as claimed in claim 5 wherein the belt includes at least two plies of reinforcing fabric therein and the second layer is disposed between any two such plies.

7. A conveyor belt for transporting materials comprising at least:
   (A) a first layer of flexible material;
   (B) a second layer of flexible material in underlying relationship to said first layer, said second layer formed of flexible plastic material and extending generally throughout the length of the belt with at least one portion thereof having uniformly distributed short lengths of randomly dispersed wire incorporated therewith to provide a memory-retaining layer for receiving and retaining magnetic signals applied thereto; and
   (C) a third layer of flexible material positioned in underlying relationship to said second layer, all said layers being joined into an integral composite structure.

8. A belt as claimed in claim 7 wherein the short lengths of wire are disposed substantially within the second layer and throughout each portion thereof, and said second layer extending generally throughout the length and width of the belt.

9. A belt as claimed in claim 7 wherein the short lengths of wire are disposed over the top surface of said second layer with said second layer extending substantially throughout the length and width of the belt.

10. A belt as claimed in claim 7 wherein the second layer comprises a plurality of spaced parallel memory-retaining layers positioned in the same plane thereof across the width of the belt and extending generally lengthwise thereof.

11. A belt as claimed in claim 7 wherein the thickness of the first layer thereof is greater than the thickness of the third layer thereof.

12. A belt as claimed in claim 7 wherein the first and third layers include at least one ply of textile fabric.

13. A belt as claimed in claim 7 wherein the first and third layers are comprised of flexible plastic material and at least one of said layers contains a layer of reinforcing material therein extending longitudinally of the belt and substantially parallel to the second layer thereof, said reinforcing material including at least one ply of reinforcing fabric therein.

14. A belt as claimed in claim 13 wherein the belt includes at least two plies of reinforcing fabric therein and the second layer is disposed between any two such plies.

References Cited

UNITED STATES PATENTS 1,394,018 10/1921 Jackson.
3,084,784 4/1963 Zoubek _____ 198—38

EDWARD A. SROKA, Primary Examiner

U.S. Cl. X.R.

179—100.2; 198—38